No. 674,074. Patented May 14, 1901.
D. W. BENNETT.
EXPANSION BOLT.
(Application filed Oct. 19, 1900.)
(No Model.)

WITNESSES:
A. V. Groupe
C. E. Parker

INVENTOR
Dwight W. Bennett
BY H. V. Hinton
ATTORNEY

THE NORRIS PETERS CO., PHOTO-LITHO., WASHINGTON, D. C.

UNITED STATES PATENT OFFICE.

DWIGHT W. BENNETT, OF PHILADELPHIA, PENNSYLVANIA, ASSIGNOR TO WALTER E. DEVLIN, OF SAME PLACE.

EXPANSION-BOLT.

SPECIFICATION forming part of Letters Patent No. 674,074, dated May 14, 1901.

Application filed October 19, 1900. Serial No. 33,602. (No model.)

*To all whom it may concern:*

Be it known that I, DWIGHT W. BENNETT, a citizen of the United States, residing at the city of Philadelphia, State of Pennsylvania, have invented certain new and useful Improvements in Expansion-Bolts, of which the following is a full, clear, and exact description, reference being had to the accompanying drawings, forming a part of this specification.

My invention relates to expansion-bolts, and has for its object to provide such a bolt having an expansion-cover capable of more easy insertion and removal from fixed position in the wall or other place where it is to be used and which will maintain its fixed position therein with greater certainty.

To these ends my invention consists in the device hereinafter described, and particularly pointed out in the claims.

Figure 1:
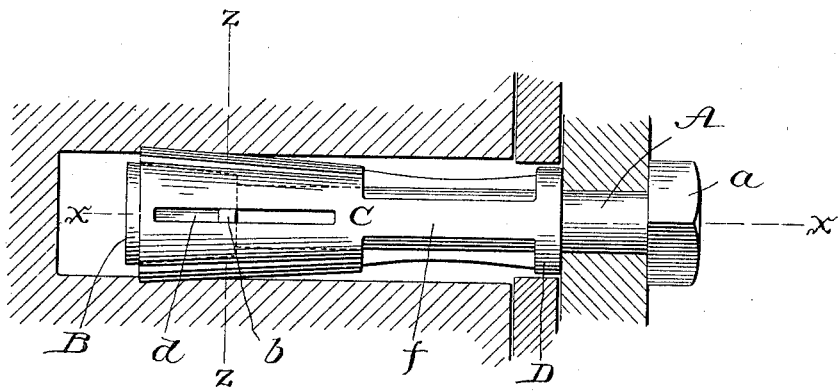
Figure 2:
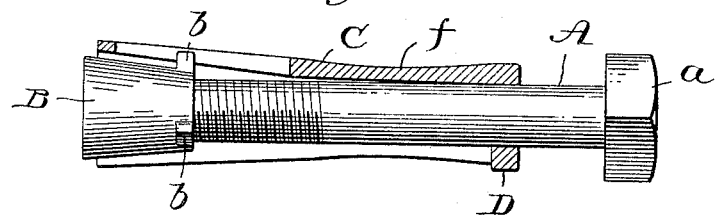
Figure 3:
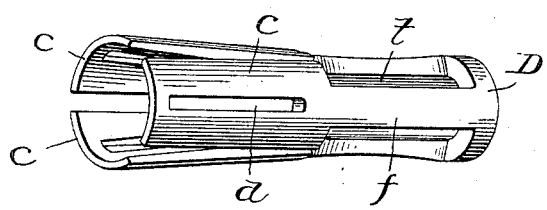
Figure 4:
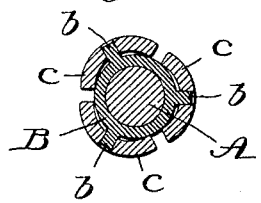
Figure 5:
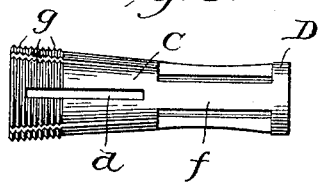

In the drawings illustrating my invention, Figure 1 is a side elevation thereof; Fig. 2, a longitudinal view, partly in section, on the line $x\ x$ of Fig. 1; Fig. 3, a perspective of the spring-sleeve detached; Fig. 4, a cross-section of Fig. 1 on the line $z\ z$, and Fig. 5 a detached view of part of the sleeve to show an additional feature.

The screw-threaded bolt A, with driving-head $a$, is as usual, and its screw-threads register with the screw-threaded retaining head or nut B. The latter in my improved device is preferably of the shape externally of a frustum of a cone arranged in the combination with its smaller end toward the head or nut end of the screw-bolt A in order that when drawn within the spring-sleeve its whole exterior will bear against the spring-sections of the sleeve and expand the latter, at the same time creating a spring tension therein. The retaining-nut B is provided on its periphery with guiding and retaining ribs $b$, arranged longitudinally thereon, the number of said ribs depending on the number of sections or wings (hereinafter described) on the spring-sleeve, hereinafter mentioned, one such rib to each sleeve-section. The spring-sleeve C is shown constructed in three sections or wings $c$, the spring tendency being laterally outward near the inner or driven end of the screw-bolt. These sections or wings constituting the spring-sleeve consist of a thin steel or other metallic tube split longitudinally for a part of its length, forming segmental or curved springs united integrally at the base, the latter forming a ring or collar D, by which the spring-sleeve is maintained at all times on the bolt. These sections of the spring-sleeve are longitudinally slotted, as at $d$, in order that the ribs $b$ of the retaining head or nut B may slide therein, and hence the said parts be retained together in proper relation by such sliding connection. The tendency of these spring-sleeve sections being to spread outward toward the extreme end and give their widest separation from each other at the driven end of the bolt, they assume, collectively, an interior shape exactly coinciding at all times to and registering with the inverted conical retaining head or nut B, so that when said head B is drawn by its smaller end within the spring-sleeve it will press the sections of the latter outward from their far ends against a spring tension thereby created and give said spring-sleeve under such pull an internal conical form, as aforesaid. These sleeve-sections are not less than two in number, but preferably at least three, as shown in the drawings. They are preferably radially ribbed, as seen at $g$, Fig. 5, in order the better to aid in retaining the expansion-bolt cover in the opening of the wall or in the lead, iron, or other metallic body in which the bolt is to be inserted. In the drawings the spring-sleeve is shown as a tube so cut and shaped as to form a ring or collar D, with carrying-arms $f$, one for each separate section or wing $c$ of the spring-sleeve. It is obvious, however, that the part cut away (indicated at $t$, Fig. 3) is merely to save metal, while perhaps giving an easier spring action. It is equally obvious that the collar D, arms $f$, and spring-sleeve sections $c$ need not be integral. I prefer for greater facility in casting to make each sleeve and its arm integral and to cast the ring or collar separately and then assemble and firmly unite the said arms to the collar or ring. The bolt and its expansion-cover, are inserted, as usual, in the wall or other body, and its operation and utility are obvious from the description already given.

Having thus described my invention, what

I claim as new, and desire to secure by Letters Patent, is—

1. In combination with a screw-threaded bolt and a screw-threaded conical expanding-head B provided with ribs $b$, of an expansion-cover consisting of an expansible metallic tube or sleeve longitudinally split for a part of its length forming segmental spring-sections united at the base upon a ring or collar, said spring-sections being longitudinally slotted to receive the ribs $b$ of the head and form a sliding connection therewith; substantially as described.

2. In combination with a screw-threaded bolt and a screw-threaded expanding-head B, of an expansion-cover composed of a wing or collar D permanently encircling the bolt, a metallic tube or sleeve longitudinally split for a part of its length forming segmental spring-sections, and arms $f$ uniting the sleeve with the collar; substantially as described.

In testimony whereof I have hereunto affixed my signature this 13th day of October, A. D. 1900.

DWIGHT W. BENNETT.

Witnesses:
ANDREW V. GROUPE,
H. T. FENTON.